Patented Oct. 27, 1931

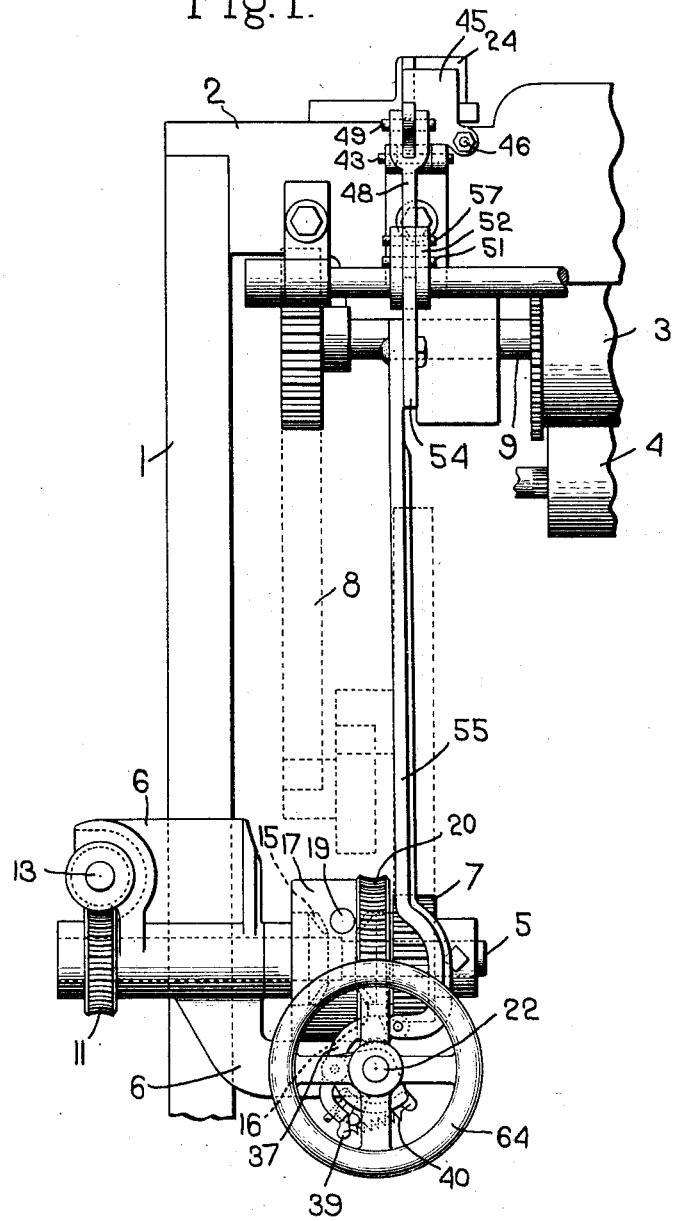

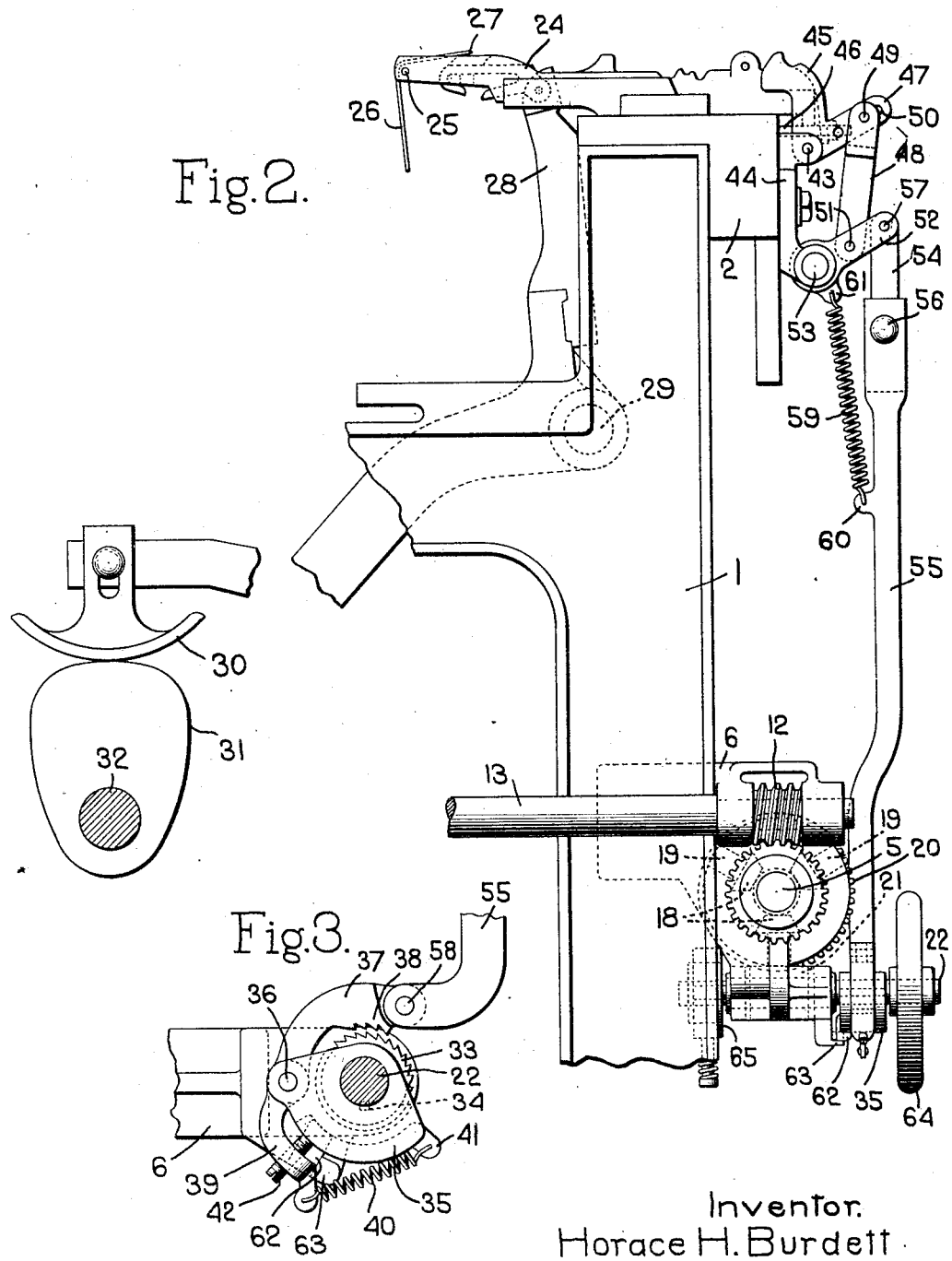

1,828,957

UNITED STATES PATENT OFFICE

HORACE H. BURDETT, OF HOPEDALE, MASSACHUSETTS, ASSIGNOR TO DRAPER CORPORATION, OF HOPEDALE, MASSACHUSETTS, A CORPORATION OF MAINE

POSITIVE LET-BACK MECHANISM FOR LOOMS

Application filed July 30, 1930. Serial No. 471,702.

In the pending application of Clare H. Draper, Serial No. 429,408, filed February 18, 1930, there is disclosed a take-up mechanism for looms in which the connections from the driving element to the take-up roll are permanently maintained both during the taking up and the letting back movements and in which these connections are positively, uniformly, and accurately operated to drive the take-up roll in the one direction to effect take-up, and, when let-back is required, to effect a relative rotary shift of the take-up roll with respect to the driving element to decrease or reverse the rotation of the take-up roll thus to effect let-back and prevent the formation of a thin place in the cloth. In the preferred form of that invention, the driving connections include a planetary or differential system of gears in which the revoluble gears are carried by a housing. When the take-up roll is being driven to effect take-up, the housing is held against rotation and when let-back is required, the housing is positively rotated. The preferred means for thus rotating the housing includes an auxiliary shaft carrying a worm engaging a worm wheel on the housing, a ratchet wheel on the auxilary shaft, a pawl carrier, a pawl yieldingly held in engagement with the ratchet wheel and a connection from the pawl carrier to an element, such as the usual filling fork slide, which is given a definte, positive movement when a filling fault occurs. This movement is thus transmitted through the connections described to rotate the housing and secure the desired let-back.

The present invention is an improvement upon the foregoing and has for its principal object to provide means for rotating the take-up mechanism to effect let-back which is normally held out of operative engagement with the shaft, such as the auxiliary shaft referred to, and which acts upon the occurrence of a filling fault momentarily and operatively to engage this shaft and positively rotate the same to effect the desired let-back. One great advantage of this feature of the invention is that the auxilary shaft is thus left free to be turned by hand in either direction. Since the means which thus acts positively to effect let-back is normally held out of operative engagement with the auxiliary shaft or other element, it follows that this auxiliary shaft is free to be rotated manually as by a hand wheel to shift the position of the fell either forward or backward. When, for example, a pick-out is required and the loom is stopped, it is not necessary to disconnect the let-back mechanism, but the operative is left free to turn the auxiliary shaft with one hand. Thus the operative can bring the reed to the front center, carefully inspect the position of the fell of the cloth with respect to the reed, and with one hand only adjust the take-up mechanism to shift the fell into the required position.

The object of the invention is further to provide a mechanism such as that set forth in which the pawl for actuating the ratchet wheel is normally held out of engagement with the ratchet wheel, thus leaving the auxiliary shaft free to be turned by hand.

The object of the invention is further to provide such a mechanism in which the operative connection for rotating the auxiliary shaft is made directly to the pawl and acts first to throw the pawl into cooperative engagement with the ratchet wheel and then to rotate the ratchet wheel to effect the desired let-back.

These and other objects and features of the invention will appear more fully from the accompanying description and drawings and will be particularly pointed out in the claims.

The drawings illustrate a construction similar to that shown in the aforesaid application, together with a preferred form of the present invention embodied therein.

In the drawings:

Fig. 1 is a front elevation of the front end of the loom.

Fig. 2 is a left-hand side elevation partially broken away of the construction shown in Fig. 1.

Fig. 3 is an enlarged detail partially in vertical cross section of the ratchet and operating mechanism therefor shown in Fig. 1.

The loom comprises the usual side frames, of which a portion of the left-hand frame 1 is shown with the breast beam 2 extending therefrom to the opposite side frame. A usual form of take-up roll 3 is journalled in the side frames under the breast beam and usually presents a roughened surface to grip the cloth which is wound on the cloth roll 4 by frictional engagement with the take-up roll. A shaft 5 is journalled in a bearing bracket 6 supported on the bottom of the frame and this shaft has journalled thereon a gear 7. A train of gearing which may be of any suitable arrangement and indicated generally at 8 extends from the gear 7 to the shaft 9 of the take-up roll so that any rotation imparted to the gear 7 will in turn be positively and definitely imparted to the take-up roll. But it will be understood that the particular driving connections between the element 7 and the shaft 9 of the take-up roll may be of any suitable construction so long as they act to impart positively, directly, and accurately the rotation of the take-up roll in either direction according to the direction of rotation of the element 7.

The shaft 5 has keyed thereto a worm wheel 11 and this worm wheel meshes with and is driven by a worm 12 keyed to a shaft 13 journalled in the bearing bracket 6 and extending rearwardly in the loom frame and positively driven from one of the usual loom shafts. The shaft 5 has keyed thereon a driving element in the form of a bevelled gear 15.

A driven element in the form of a bevelled gear 16 is journalled in axial alignment with the driving element or bevelled gear 15 and is preferably, for that purpose, journalled on the shaft 5. This driven element 16 is the one which imparts a direct driving connection to the take-up roll and for that purpose is preferably formed rigid or integral with the gear 7 and thus acts through the train of gearing 8 to drive the take-up roll.

A differential system of gearing is illustrated, including the bevelled gears 15 and 16, and comprises a cylindrical housing 17 with one or more intermediate bevelled gears 18, herein shown as three in number, having their shafts 19 journalled radially therein and so arranged that the bevelled gears 18 mesh with both of the bevelled gears 15 and 16.

The outer cylindrical surface of the housing 17 is formed to present a worm wheel 20 and this worm wheel 20 meshes with a worm 21 secured to an auxiliary or transverse shaft 22 journalled in the bearing bracket 6.

It will thus be seen that under normal conditions with the shaft 22 immovable, the worm 21 will lock the housing 17 against rotation so that as the shaft 13 is rotated, a direct positive drive will be imparted from the driving element 15 through the intermediate gears 18 to the driven element 16 and therefrom to the take-up roll to effect take-up. The take-up roll will then be driven positively from the driven element at a fixed ratio of speed, depending upon the proportions of the driving connections therebetween. If now rotation be imparted to the auxiliary shaft 22, the housing 17, which is the intermediate element of the differential gearing, will be positively rotated and such rotation will effect a relative rotary shift or change in angular relation between the take-up roll and the driving element. Consequently, by rotating the auxiliary shaft 22 in the proper direction, the rotation of the take-up roll will actually decrease or be reversed according to the relative speed of rotation of the shaft 22. This rotation of the auxiliary shaft 22 therefore shifts the rotary position of the take-up roll with respect to the driving element without in any way disturbing the permanency of the connections extending from the driving element to the take-up roll. Thus the movement of the take-up roll to effect let-back is secured positively, accurately, and to an exact predetermined degree. If, when the auxiliary shafts 22 is rotated, the loom is stopped and the driving element 15 is thus held against rotation by the worm 12, then the movement imparted by the auxiliary shaft 22 to shift the relative rotary position of the take-up roll with respect to the driving element is entirely devoted to a reversal of the actual rotary movement of the take-up roll. Thus in any event, when let-back is required, the take-up rotation of the take-up roll is positively counteracted to compensate for the loss of picks due to a filling fault and to prevent the formation of a thin place in the cloth.

Rotation is imparted to the auxiliary shaft 22 thus to effect let-back, upon the occurrence of a filling fault, by connections positively and accurately operated from the filling fork slide which in turn is positively and accurately operated by the usual mechanism employed for that purpose in the loom.

A filling fork slide 24 of a usual type is shown mounted to slide forward and rearward on the top of the breast beam and has pivotally mounted at 25 in its rearward end a filling fork having the depending tines 26 and the looped forward end 27. A weft hammer 28 of the usual type is fulcrumed at 29 in the loom frame and at its rearward end carries a follower 30 riding on a cam 31 on the cam shaft 32 of the loom. If the filling is properly laid in the shed, it engages the tines 26 on the beat-up and the filling fork is rocked, raising the looped end 27. If the filling is broken or exhausted or otherwise in fault, the fork 26 is not rocked and the looped end 27 catches on the end of the weft hammer 28 so that as the cam 31 revolves, the filling fork slide is given a positive, accurate, and definite forward movement and, at the same time, through connections familiar to those skilled in the art, the desired change is effected in the operation of the loom such as the automatic replenishment of the running filling or such as the stopping of the loom. It is this movement of the filling fork slide, or a portion of this movement, that is here preferably utilized for rotating the auxiliary shaft 22 to effect let-back.

A ratchet wheel 33 is keyed at 34 to the shaft 22. A pawl carrier in the form of a sector-shaped casing 35 is journalled on the shaft 22 surrounding the ratchet wheel and has pivoted thereto at 36 a pawl 37 having one or more teeth 38 adapted to cooperate with the teeth of the ratchet wheel. The pawl is provided with an extension 39, the end of which is connected by a coiled spring 40 to a lug 41 on the pawl carrier. This spring acts to hold the pawl out of engagement with the ratchet wheel. A set screw 42 in the pawl extension adjustably abuts the periphery of the pawl carrier to limit the outward movement of the pawl. A connection extends from the pawl and this connection is operated upon the occurrence of a filling fault first to swing the pawl against the tension of the spring 40 into cooperative engagement with the ratchet wheel, and then through the pawl to rotate the ratchet wheel and thereby the shaft 22 thus to effect the desired let-back. Thus it will be seen that the pawl is normally held out of engagement with the ratchet wheel and acts momentarily only when it moves into cooperation with the ratchet wheel and rotates the ratchet wheel positively to effect the desired let-back. This enables manual means such as a hand wheel to be employed for rotating the auxiliary shaft 22 to shift the position of the fell, as when the loom is stopped and a pick-out is necessary and this manual means is readily operated by one hand because there is nothing which has to be disconnected to allow the hand wheel to be operated.

The connection for thus operating the pawl and thereby rotating the auxiliary shaft 22 is preferably actuated by the filling fork slide. A bell crank lever is fulcrumed at 43 in a bracket 44 bolted to the breast beam. The upstanding end 45 of this bell crank lever extends at the front of the end of the filling fork slide. A set screw 46 adjustably determines the rearward movement of the bell crank lever and thus the point in the forward movement of the filling fork slide when the filling fork slide will engage with the bell crank lever and begin to impart a positive forward movement thereto. The forwardly extending arm 47 of the bell crank lever has adjustably connected thereto a link 48, this adjustment being effected by placing a stud 49 in one or the other of the holes 50 in the arm 47. The lower end of the link 48 is pivoted at 51 in a bifurcated arm 52 journalled on a shaft 53 which may be the usual starter rod found on looms of this type. A two-part link 54, 55 adjustably connected together by the bolt 56 is pivotally connected at its upper end at 57 to the arm 52 and at its lower end at 58 to the end of the pawl 37. A spring 59 connected at its lower end to a lug 60 on the link 55 and at its upper end to a lug 61 projecting downward from the arm 52 acts to elevate the connections and also to hold the bell crank lever with the set screw 46 in engagement with the breast beam.

While the connections thus described ordinarily prevent the pawl carrier from rotating too far counter-clockwise, the motion in this direction is limited by the engagement of a projection 62 on the pawl carrier with a lug 63 projecting from the bracket 6. When a filling fault occurs and a change in the operation of the loom, such as a replenishment of the filling, takes place with the loom continuing to run, the cam 31 acts through the weft hammer to give a positive degree of movement to the weft fork slide and a predetermined amount of this movement, depending upon the adjustments provided, is thus imparted to the link 54, 55. The first portion of this movement swings the pawl 37 into engagement with the ratchet wheel 33 and the remainder of the movement thereupon acts to rotate the ratchet wheel and consequently the auxiliary shaft 22, the worm 21, and the housing 17. Thus the rotary angular position of the take-up roll is shifted relatively to the driving element without disturbing the permanent connections therebetween. This may be simply a decrease in the actual rotation of the take-up roll or an actual reversal of rotation. But in any event let-back takes place and a thin place in the cloth is prevented.

If, when the filling fault occurs, the loom is stopped, then the driving element 15 is held against rotation by the worm 12 and the rotation of the housing 17 acts positively to effect a reverse rotation of the take-up roll to effect the required let-back.

Suitable means are provided for readily and easily rotating the auxiliary shaft manually in either direction thus to rotate the take-up roll in either direction and shift the position of the fell as required. This is particularly useful when the loom is stopped and a pick-out is required. As a preferred means for this purpose a hand wheel 64 is mounted on the end of the auxiliary shaft 22, thus enabling the auxiliary shaft 22 to be turned manually when it is desired to adjust or set the take-up roll in proper position. A suitable friction brake 65 is also provided on the auxiliary shaft 22 to prevent any lost motion, overthrow or slippage of the connections.

The hand wheel 64 is free to be moved at all times to shift or adjust the angular position of the take-up roll in either direction as may be desired. The pawl 37, it will be observed, is held normally out of engagement with the ratchet wheel and if at any time it should have made an engagement, all that is necessary to free it is to give the hand wheel a slight turn in a clockwise direction, thus allowing the pawl to respond to the influence of the spring 40.

Having thus described the invention, what is claimed as new, and desired to be secured by Letters Patent, is:

1. A take-up mechanism for a loom comprising a shaft normally held stationary and acting when rotated to shift the position of the fell, means connected to the shaft by which it may be manually rotated to shift the position of the fell, and means normally held out of operative engagement with the said shaft and acting upon the occurrence of a filling fault momentarily and operatively to engage the shaft and positively to rotate the same in the direction to effect let-back.

2. A take-up mechanism for a loom comprising a shaft normally held stationary and acting when rotated to shift the position of the fell, a hand wheel connected to the shaft by which it may be manually rotated to shift the position of the fell, and means normally held out of operative engagement with the said shaft and acting upon the occurrence of a filling fault momentarily and operatively to engage the shaft and positively to rotate the same in the direction to effect let-back.

3. A take-up mechanism for a loom comprising a shaft normally held stationary and acting when rotated to shift the position of the fell, a hand wheel connected to the shaft by which it may be rotated thus manually to adjust the position of the fell, a ratchet wheel secured to the shaft, a pawl pivotally mounted on the pawl carrier, means acting normally to hold the pawl out of engagement with the ratchet wheel, and a connection to the pawl operated upon the occurrence of a filling fault momentarily to swing the pawl into engagement with the ratchet and rotate the ratchet and thereby the shaft to effect let-back.

4. A loom comprising a take-up roll, a driving element, a differential system of gearing between the driving element and the take-up roll for driving the latter from the former to effect take-up, means acting upon the occurrence of a filling fault to effect a change in the operation of the loom, and means normally held out of operative engagement with the intermediate element of the differential gear and upon the occurrence of the said filling fault momentarily and operatively engaged with the said intermediate element and acting thereupon to rotate the said element bodily to a predetermined extent to shift the rotary position of the take-up roll with respect to the driving element in a direction to effect let-back and prevent a thin place in the cloth.

5. A loom comprising the construction defined in claim 4, together with means connected to said intermediate element by which it may be manually rotated to adjust the position of the fell.

6. A loom comprising a take-up roll, a driving element, a permanent positive driving connection from the driving element to the take-up roll acting to rotate the take-up roll at a fixed ratio of speed with respect to the driving element to effect take-up, and means normally held out of operative engagement with the said connection and upon the occurrence of a filling fault momentarily and operatively engaged with the said connection and acting thereupon to shift the angular relation of the take-up roll with respect to the driving element to prevent a thin place in the cloth.

7. A loom comprising the construction defined in claim 6, together with means for manually and independently operating the said driving connection to adjust the position of the fell either forward or backward as desired.

8. A loom comprising a shaft, means for positively driving the shaft, a driving gear secured to the shaft, a driven gear journalled in axial alignment with the shaft, a take-up roll, a gearing connection between the take-up roll and the driven gear, a housing, an intermediate gear journalled in the housing and meshing with the driving and driven gears, an auxiliary shaft, a gearing connection between the auxiliary shaft and housing, the said auxiliary shaft normally acting to hold the housing against rotation and thus enable the take-up roll to be driven positively to effect take-up, a ratchet wheel secured to the auxiliary shaft, a pawl carrier journalled on the auxiliary shaft, a pawl pivotally mounted on the pawl carrier, means acting normally to hold the pawl out of engagement with the ratchet wheel, and a connection to the pawl actuated when let-back is required to swing the pawl momentarily into engagement with the ratchet wheel and rotate the ratchet wheel and thereby the auxiliary shaft a predetermined degree to effect positively the desired amount of let-back.

9. A loom comprising the construction defined in claim 8, together with a hand wheel connected to the auxiliary shaft by which it may be manually rotated to shift the position of the fell as desired.

10. A loom comprising a shaft, means for positively driving the shaft, a driving gear secured to the shaft, a driven gear journalled in axial alignment with the shaft, a take-up roll, a gearing connection between the take-up roll and the driven gear, a housing, an intermediate gear journalled in the housing and meshing with the driving and driven gears, an auxiliary shaft, a gearing connection between the auxiliary shaft and housing, the said auxiliary shaft normally acting to hold the housing against rotation and thus enable the take-up roll to be driven positively to effect take-up, a filling fork, a filling fork slide, means for imparting a definite, positive, sliding movement to the slide upon indication of filling absence by the fork, a ratchet wheel secured to the auxiliary shaft, a pawl carrier journalled on the auxiliary shaft, a pawl pivotally mounted on the pawl carrier, means acting normally to hold the pawl out of engagement with the ratchet wheel, and a connection to the pawl actuated by the said movement of the fork slide to swing the pawl momentarily into engagement with the ratchet wheel and rotate the ratchet wheel and thereby the auxiliary shaft to effect positively the desired amount of let-back.

11. A loom comprising the construction defined in claim 10, together with a hand wheel connected to the auxiliary shaft by which it may be manually rotated to shift the position of the fell as desired.

12. A take-up and let-back mechanism for looms comprising a driving element, a take-up roll, a train of permanent connections between said driving element and roll, one of said connections being rotatably mounted and acting when held against rotation to permit the driving element to rotate the take-up roll to effect take-up, means normally held out of operative engagement with the said connection and upon the occurrence of a filling fault momentarily and operatively engaged with the said connection and acting thereupon to rotate the said connection to decrease or reverse the rotation of the take-up roll thereby to effect let-back, and means for independently and manually rotating said connection to shift the position of the fell as desired.

In testimony whereof, I have signed my name to this specification.

HORACE H. BURDETT.